May 15, 1923.

W. E. KOCH

SUBSURFACE FISH BAIT

Filed Oct. 18, 1920

1,455,624

WITNESSES

INVENTOR
WILLIAM E. KOCH
BY
ATTORNEYS

Patented May 15, 1923.

1,455,624

UNITED STATES PATENT OFFICE.

WILLIAM E. KOCH, OF NEW ROCHELLE, NEW YORK.

SUBSURFACE FISH BAIT.

Application filed October 18, 1920. Serial No. 417,621.

*To all whom it may concern:*

Be it known that I, WILLIAM E. KOCH, a citizen of the United States, and a resident of New Rochelle, in the county of Westchester and State of New York, have invented a new and Improved Subsurface Fish Bait, of which the following is a full, clear, and exact description.

This invention relates to fish lures or bait and has for an object to provide an improved construction which when used in trolling will give the bait the appearance of a live fish.

Another object in view is to provide a lure or bait for trolling formed of such a shape as to automatically move back and forth and pull through the water in a given direction.

A still further object more specifically of the invention is to provide a lure for trolling in which the parts are formed so that the lure will engage the water in such a manner as to turn on its side and zigzag continuously as it is pulled through the water and thereby simulate the action of a live fish when the same is being chased.

In the accompanying drawings—

Figure 1:
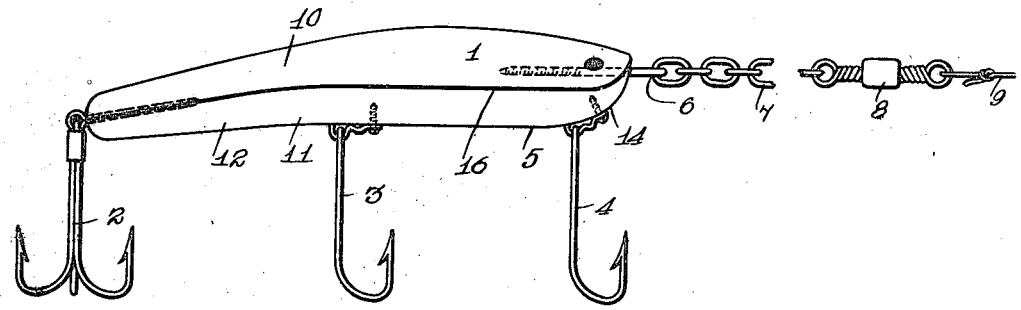
Figure 1 is a side view of the lure disclosing an embodiment of the invention.
Figure 2:
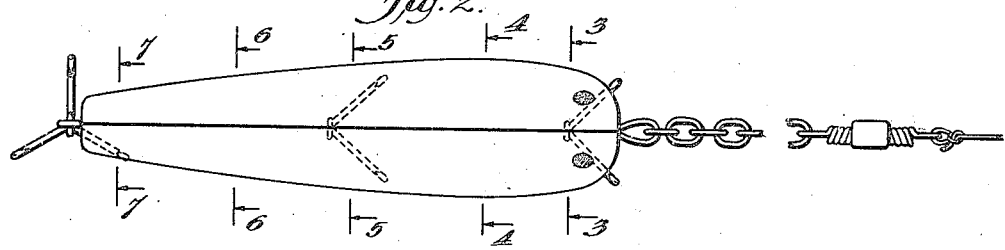
Figure 2 is a top plan view of the structure shown in Figure 1.
Figure 3:
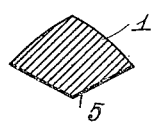
Figure 3 is a transverse sectional view through Figure 2 on line 3—3.
Figure 4:
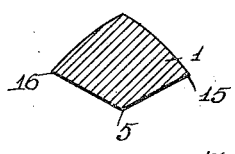
Figure 4 is a transverse sectional view through Figure 2 on line 4—4.
Figure 5:
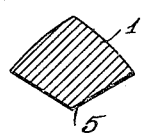
Figure 5 is a transverse sectional view through Figure 2 on line 5—5.
Figures 6, 7:
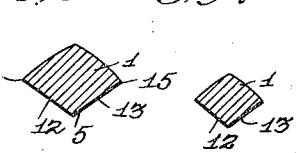
Figure 6 is a transverse sectional view through Figure 2 on line 6—6.
Figure 7 is a transverse section through Figure 2 on line 7—7.

Referring to the accompanying drawings by numeral, 1 indicates the body of the lure which is provided with hooks 2, 3 and 4 arranged on each end respectively of the body 1 and centrally thereof. The hooks 3 and 4 preferably connected to the body 1 are on the lower side whereby they act as weights for what may be termed the keel line 5 of the body 1. An eye or other suitable connecting member 6 is connected to the front of the body 1 to which a chain or other flexible member is connected, said chain preferably carrying a swivel 8 to which the trolling cord 9 is secured.

Figure 8:
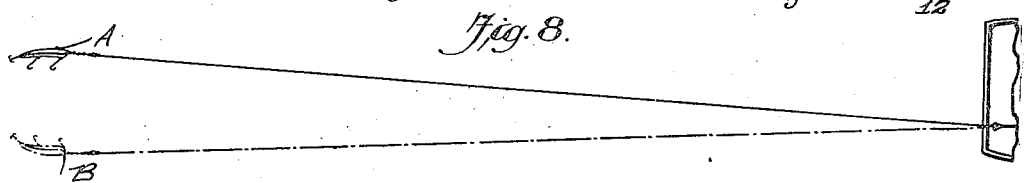
Figure 8 is a diagram showing the relative back and forth movement of the body when being pulled through the water.
Figure 9:
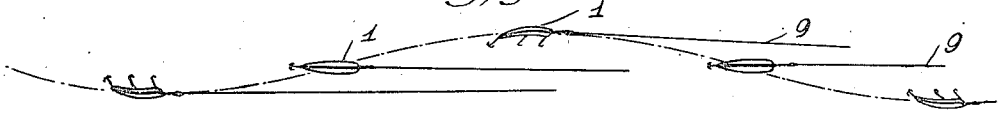
Figure 9 is a diagram showing the zigzag course pursued by the bait as it is pulled through the water.

By this construction and arrangement the body 1 is free to move in any direction desired as it is pulled through the water. In constructing the body 1 it is substantially diamond-shape in cross section substantially at any point as indicated in Figures 3 to 7. In addition the rear end or tail section 10 tapers somewhat and is also curved or bent at approximately point 11 which is slightly more than half way from the front end of the body. This causes the sides 12 and 13 to be acted upon strongly by the water when the body is turned over somewhat as is indicated in Figure 8. The front of the body is rounded at 14 so that the center of gravity is below the line of draft which is, of course, in line with the member 6. This tends to keep the bait upright and is also important in that it permits the two upper planes of the body near the front to act so as to produce the zigzag desired. If the end was pointed and connections made at the point shown in Figure 1 the bait would have practically no zigzag motion or if the connections were made as shown in Figure 1 and the body pointed so that the point would be below the chain 7, the body would revolve in large spirals as shown by practical demonstrations. From practical demonstrations it appears that the two upper planes adjacent the front act with the rounded end 14 to cause the body to produce a zigzag course as shown in Figure 9 while the under rear surfaces 12, 13 prevent the body from turning over. It will, therefore, be seen that the two upper surfaces adjacent the front act to cause the bait to dive from side to side and thereby produce a zigzag course while the surfaces 12 and 13 assisted by the weight of the hooks cause the body to resist turning over.

In one size sample which was tested, the body 1 moved a distance of approximately a foot beyond each side of a central line so that the movements from extreme side to side was two feet and as the body moved forwardly at the same time it produced the motion indicated in Figure 9 which is the usual action of a small fish being chased by a large fish. When the bait has reached the position indicated at A (Fig. 8), the pressure of the water against the surface 13, for instance, is so great that it will begin to roll the body over so as to cause it to lay on the surface 13. During this rolling action the bait moves over and eventually assumes the position shown at B which is the extreme position in that direction. When in this position the water is acting strongly on the surface 12 and will cause the bait to begin to roll in the opposite direction. This back and forth rolling motion as the bait moves forward causes the bait to travel in a zigzag course though the bait never turns over.

It will be noted that in the positions A and B the bait is on the side and the lines 15 and 16 are almost in their respective positions. By reason of the action of the water on the surface 12 and 13 and the weight of the hooks 3 and 4, the body 1 never turns completely over.

In forming the body it is intended to paint or otherwise color the same, to suit the taste of the particular fish sought. In the Great Lakes at a certain time of the year the body 1 must be painted or colored yellow in some manner as the fish would not pay any attention to the body otherwise. At other times of the year, in the same waters or in some other waters a bright reflecting surface must be provided or some other color according to the fish sought in the season in which the bait is being used. It is, therefore, evident that the body 1 could be colored as desired without departing from the spirit of the invention and without in any way varying its action when in the water.

What I claim is:—

1. A fish lure comprising a body having a straight forward section and a straight rear section depending from the forward section in such a manner that the entire body appears substantially as an arc when looked at from the side, the lower surface of said body from the front to the rear being substantially V-shaped and said surface being rounded at the front to produce a round blunt end merging into the side of the bottom, means for connecting hooks to the bottom of the bait on a central line and to the rear end of the body near the center, and a flexible pulling member connected to the front of said body, said flexible pulling member permitting freedom of the body and said rear depending section acting against the water to throw the body on its side and thereby point the head from a straight course.

2. A fish bait or lure comprising a body substantially diamond-shape in cross section at all points, said body having a rear section inclined downwardly from substantially a central point of the body so as to present a substantially arc-shaped structure when viewed from the side, the two lower surfaces formed by the diamond-shaped structure presenting deflecting planes acting to throw the body on one side when the body is drawn through the water and thereby point the body from a straight course, means for connecting hooks to said body along the center of the bottom and at the rear end, and means for connecting a flexible trolling line to the front of said body.

3. In a fish lure of the character described a body rounded at the front and formed substantially diamond-shape in cross section from the rounded front to the rear end, said body having a rear section inclined downwardly from substantially a central point of the body whereby the front part of the body will rest on a substantially V-shaped bottom and deflecting converging planes will be presented at the rear section so that when the body is drawn through the water for throwing the bait on one side, such action will cause the body to move from a straight course, and a flexible trolling member connected to the front of said body.

WILLIAM E. KOCH.